(12) United States Patent
Poulad et al.

(10) Patent No.: US 11,620,761 B2
(45) Date of Patent: Apr. 4, 2023

(54) DEPTH SENSING VIA DEVICE CASE

(71) Applicant: Microsoft Technology Licensing, LLC, Redmond, WA (US)

(72) Inventors: Navid Poulad, San Jose, CA (US); Rayna Demaster-Smith, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/341,218

(22) Filed: Jun. 7, 2021

(65) Prior Publication Data
US 2022/0392093 A1 Dec. 8, 2022

(51) Int. Cl.
*G06T 7/593* (2017.01)
*G06T 7/40* (2017.01)
*G06T 7/11* (2017.01)
*G06T 7/80* (2017.01)
*H04N 13/239* (2018.01)
*G06T 17/00* (2006.01)
*H04N 9/04* (2006.01)
*G06T 15/04* (2011.01)
*H04N 13/344* (2018.01)
*G02B 27/01* (2006.01)
(Continued)

(52) U.S. Cl.
CPC .......... *G06T 7/593* (2017.01); *G02B 27/0172* (2013.01); *G06T 7/11* (2017.01); *G06T 7/40* (2013.01); *G06T 7/521* (2017.01); *G06T 7/85* (2017.01); *G06T 15/04* (2013.01); *G06T 17/00* (2013.01); *H04N 9/045* (2013.01); *H04N 13/239* (2018.05); *H04N 13/344* (2018.05); *G02B 2027/014* (2013.01); *G02B 2027/0174* (2013.01); *G02B 2027/0178* (2013.01); *G06T 2207/10024* (2013.01); *G06T 2207/10028* (2013.01); *G06T 2207/30196* (2013.01); *H04N 2013/0081* (2013.01); *H04S 7/301* (2013.01)

(58) Field of Classification Search
None
See application file for complete search history.

(56) References Cited

U.S. PATENT DOCUMENTS

2013/0050258 A1 2/2013 Liu et al.
2018/0365897 A1* 12/2018 Pahud .................. G06F 3/1454
(Continued)

OTHER PUBLICATIONS

PetaPixel, https://petapixel.com/2015/03/19/ring-cam-an-engagement-ring-box-with-a-built-in-camera-for-capturing-proposals/, all pages, Mar. 19, 2015.*

(Continued)

*Primary Examiner* — Frank S Chen
(74) *Attorney, Agent, or Firm* — Alleman Hall Creasman & Tuttle LLP

(57) ABSTRACT

Examples are disclosed that relate to displaying a hologram via an HMD. One disclosed example provides a method comprising obtaining depth data from a direct-measurement depth sensor included in the case for the HMD, the depth data comprising a depth map of a real-world environment. The method further comprises determining a distance from the HMD to an object in the real-world environment using the depth map, obtaining holographic imagery for display based at least upon the distance, and outputting the holographic imagery for display on the HMD.

20 Claims, 13 Drawing Sheets

(51) Int. Cl.
　　　*G06T 7/521*　　　(2017.01)
　　　*H04N 13/00*　　(2018.01)
　　　*H04S 7/00*　　　(2006.01)

(56) References Cited

U.S. PATENT DOCUMENTS

2021/0375020 A1* 12/2021 Zhang ..................... G06T 19/20
2021/0407215 A1* 12/2021 Evangelista ............ G06T 19/20
2022/0101623 A1*  3/2022 Walsh ....................... G01H 7/00

OTHER PUBLICATIONS

"International Search Report and Written Opinion Issued in PCT Application No. PCT/US22/028418", dated Aug. 9, 2022, 11 pages.

\* cited by examiner

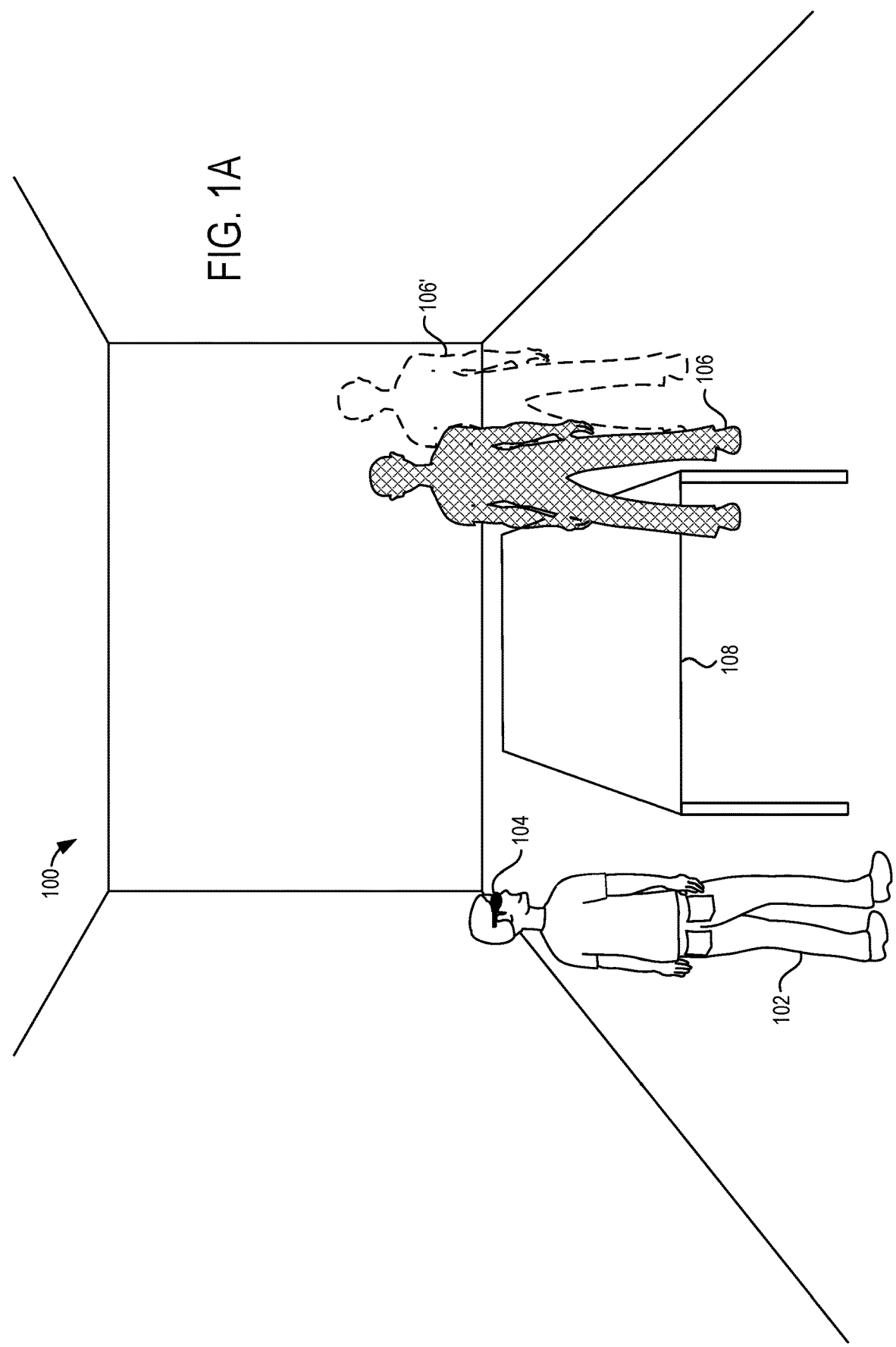

DEPTH SENSING VIA DEVICE CASE

BACKGROUND

An augmented reality head-mounted display device (HMD) may use depth information to display holograms with respect to a real-world environment. For example, an augmented reality HMD may use an on-board depth imaging system to sense distances to objects in the real-world environment. The determined distances then may be used to compute holographic imagery for display via a see-through display device of the HMD.

SUMMARY

Examples are disclosed that relate to displaying a hologram via an HMD. One disclosed example provides a method comprising obtaining depth data from a direct-measurement depth sensor included in the case for the HMD, the depth data comprising a depth map of a real-world environment. The method further comprises determining a distance from the HMD to an object in the real-world environment using the depth map, obtaining holographic imagery for display based at least upon the distance, and outputting the holographic imagery for display on the HMD.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 1A shows a scenario in which an example head-mounted display device (HMD) presents holographic imagery based upon incorrect distance information.

DETAILED DESCRIPTION

Figure 1B:
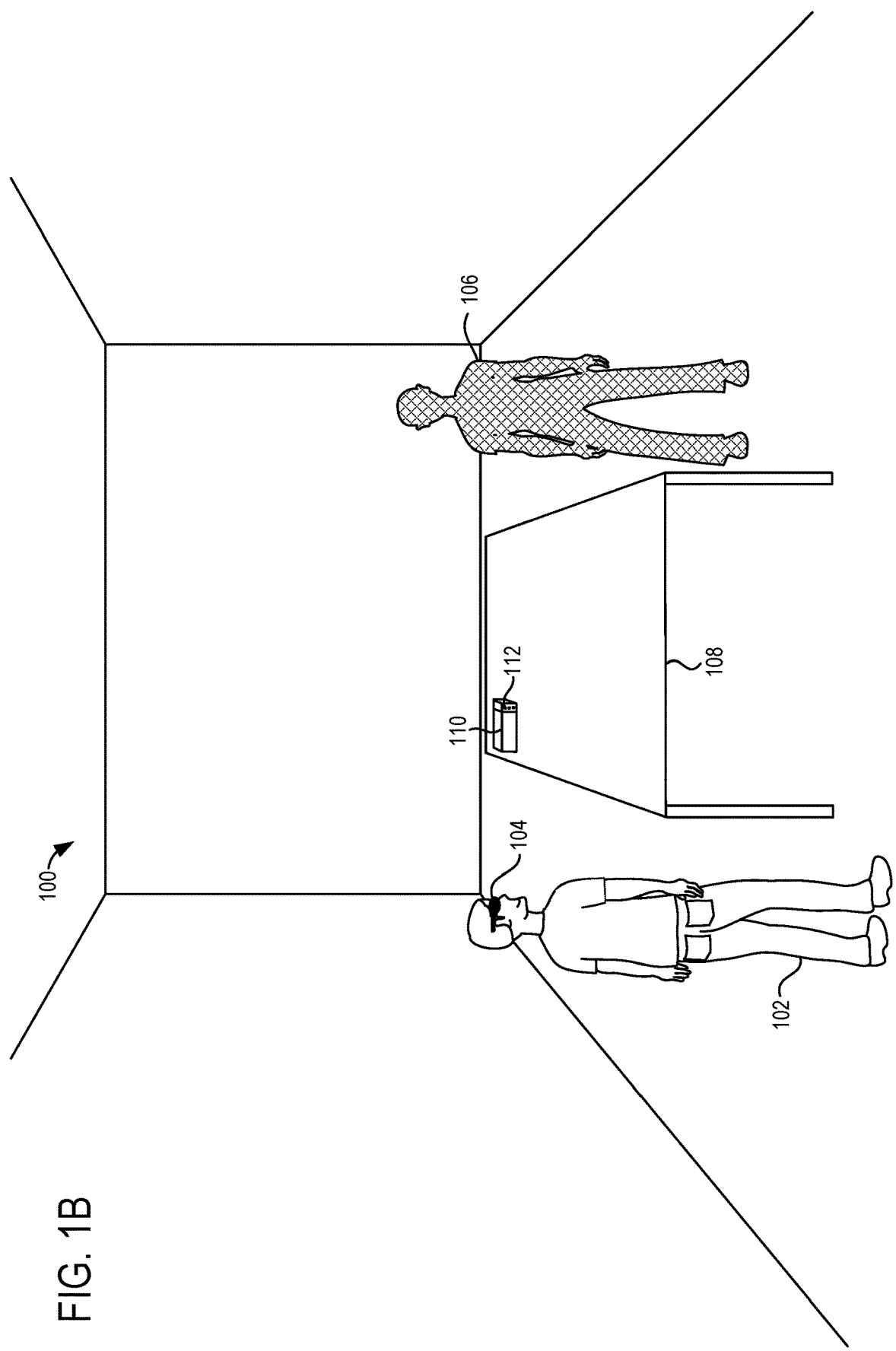
FIG. 1B shows a scenario in which the holographic imagery of FIG. 1A is displayed based upon direct-measurement depth data from an example HMD case comprising a direct-measurement depth sensor.

As introduced above, an augmented reality head-mounted display device (HMD) uses depth information to display holograms with respect to a real-world environment. FIG. 1A shows one example of a real-world environment in the form of a room 100 in which a user 102 is wearing an HMD 104. The HMD 104 is used to display a hologram 106.

The HMD 104 can use depth imaging to determine a distance between the device 104 and one or more objects in the environment (e.g., an edge of a table 108), and to generate a depth map of the real-world environment 100. The depth map is used to determine a placement of the hologram, including a position, an orientation, and/or a scale factor for the hologram 106.

Some HMDs may utilize a direct measurement depth sensor, such as a time of flight (ToF) camera or a structured light depth camera, to measure distances to objects in a use environment. However, ToF cameras may be larger than cameras that sense two-dimensional intensity images. Thus, other HMDs having smaller form factors may use a stereo camera arrangement comprising a pair of two-dimensional cameras positioned at spaced-apart locations on the HMD to determine depth by performing triangulation. However, stereoscopic depth measurement is sensitive to changes in the positions and orientations of the stereoscopic cameras. A deviation in the position and/or orientation of one camera with respect to the other camera in the stereo pair may result in erroneous depth measurements. For example, bending or dropping the HMD can change the position and/or orientation of one or both cameras in the stereo pair away from their calibrated positions and/or orientations, which can introduce error in the depth measurement.

A hologram may be improperly displayed based on the erroneous depth measurement. For example, the hologram 106 is computed to be displayed adjacent to a table 108, at location 106'. However, using stereoscopic depth alone, the HMD 104 may not have an accurate sense of where an edge of the table 108 is located, and may erroneously place the hologram at the position of hologram 106, making the hologram appear to be on or extending through the table 108.

Thus, examples are disclosed that relate to the use of a direct measurement depth camera integrated with a case for a wearable device to help address issues as discussed above. Referring to FIG. 1B, the use of direct measurement depth data acquired via a direct measurement depth sensor on a case 110 may allow the hologram to be placed in an intended location, where the HMD and the table are both visible to the direct measurement depth sensor.

Figure 2:
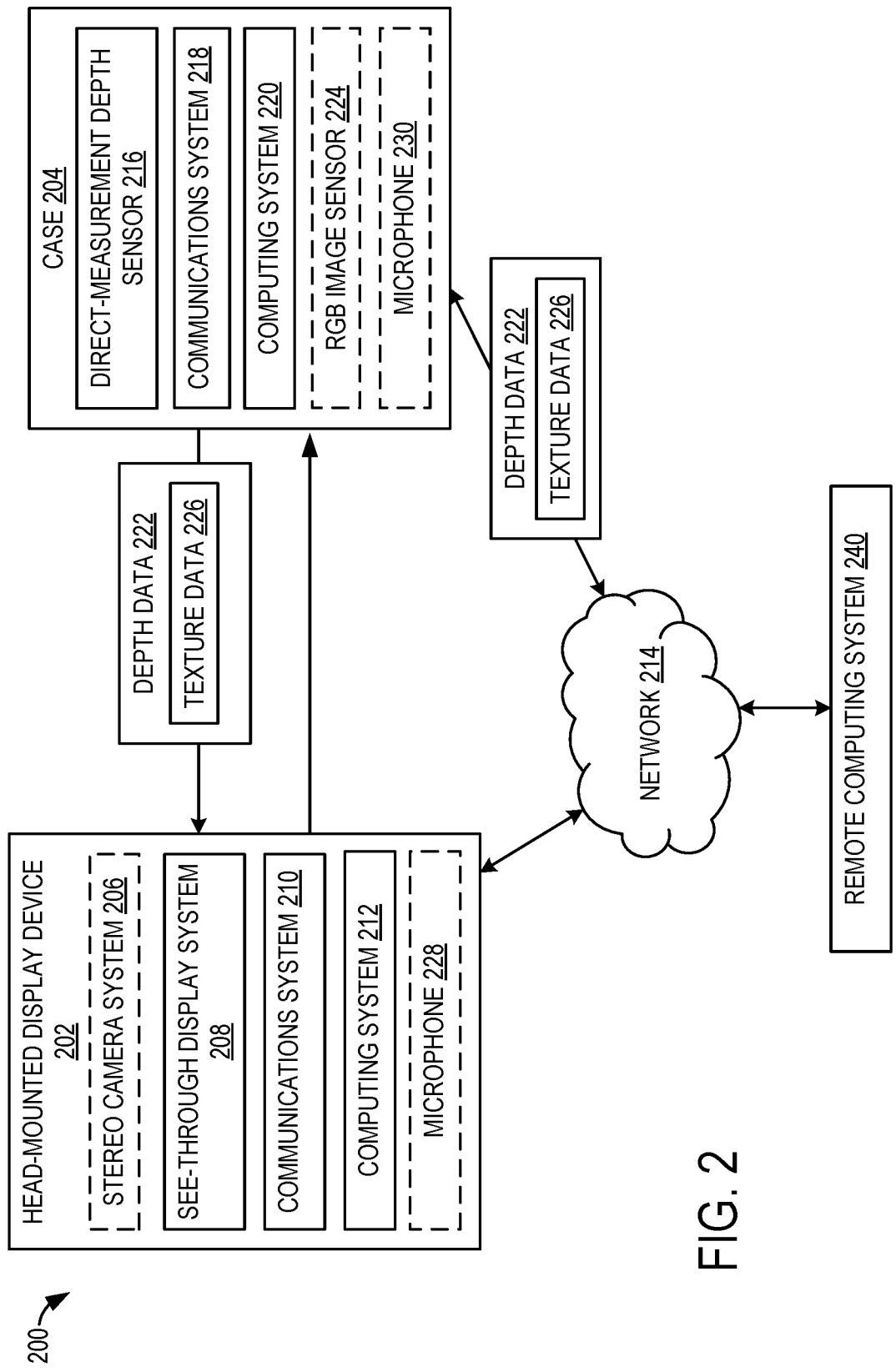
FIG. 2 shows a schematic diagram of an example system comprising an HMD and a case for the HMD, wherein the case includes a direct-measurement depth sensor.

FIG. 2 shows a block diagram of an example system 200 comprising an HMD 202 and a case 204 for the HMD. As introduced above, the HMD 202 may include an indirect-measurement depth sensor, such as a stereo camera system 206. As described in more detail below with reference to FIG. 3, the HMD 202 further comprises a see-through display system 208, a first communications system 210, and a first computing system 212. The first computing system 212 is configured to control the display of images via the see-through display system 208 and to control communication with the case 204 via the first communications system 210. In some examples, the case 204 and the HMD 202 communicate directly with one another. In other examples, the case 204 and the HMD 202 are communicatively coupled via a network 214.

The case 204 comprises a direct measurement depth sensor 216, a second communications system 218, and a second computing system 220. The second computing system 220 is configured to control the direct-measurement depth sensor 216 to acquire depth data 222 of a real-world environment and to control the second communications system 218 to send the depth data 222 to the HMD 202. In this manner, the HMD 202 can display a hologram based at least upon the depth data 222 output by the direct-measurement depth sensor 216, without incorporating a direct measurement depth sensor into the HMD itself. In some examples, the case further may comprise a red/green/blue (RGB) image sensor 224. As described in more detail below, the RGB image sensor may be used to acquire image data for use in texture mapping, as illustrated by texture data 226. Such texture mapping data can be used in holographic communications scenarios, and/or other possible scenarios. The HMD 202 and/or the case 204 each also may optionally include a microphone 228, 230. As described in more detail below, the microphone 228 and/or microphone 230 may be configured to capture a user's voice for use in a communication session.

The system 200 may communicate with a remote computing system 240. For example, the remote computing system 240 may comprise a server (e.g., a cloud-based computing service) configured to generate holographic imagery based upon depth data 222 and/or texture data 226 received from the case 204, among other possible functions. The remote computing system further may facilitate the conduction of holographic communication sessions between users, and/or various other functions.

Figure 3:
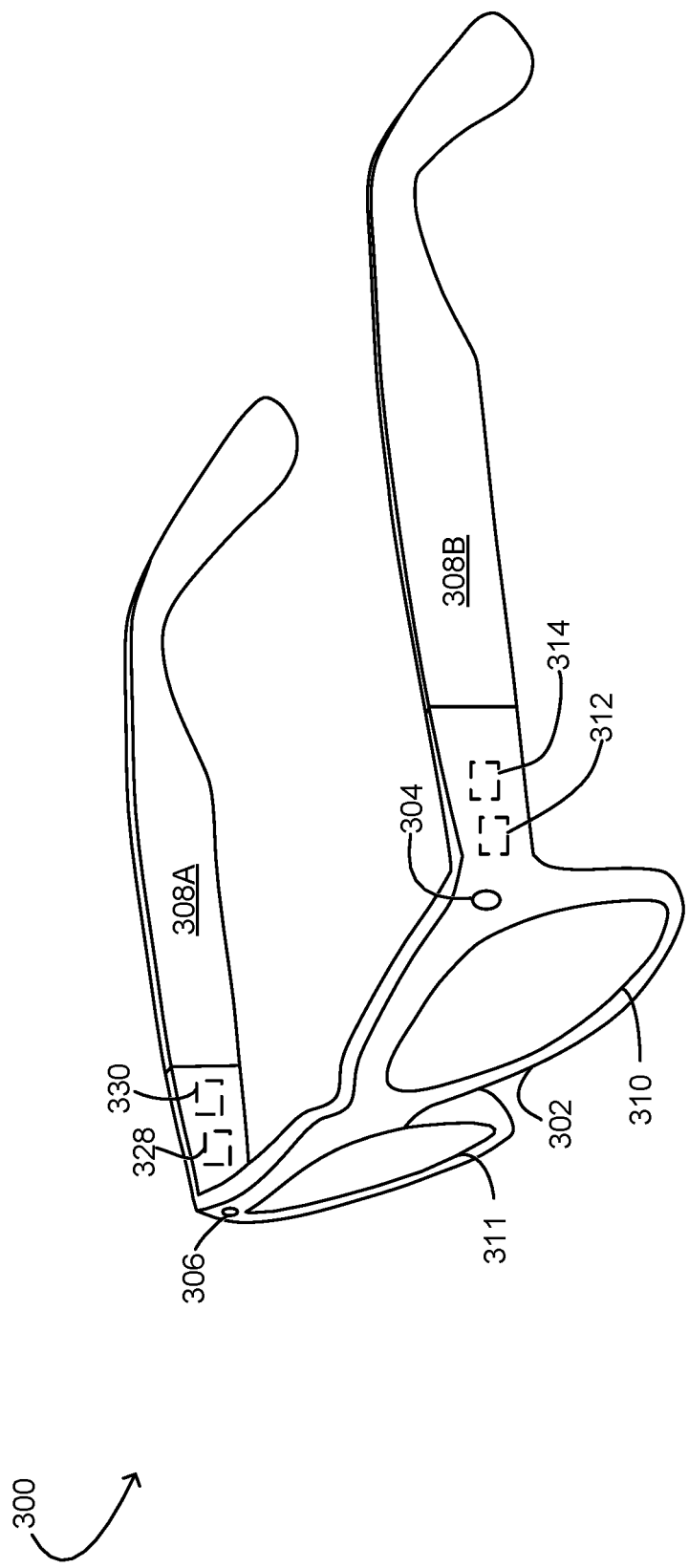
FIG. 3 shows an example HMD suitable for use as the HMD of FIGS. 1A-1B and 2.

FIG. 3 illustrates an example HMD device 300. HMD device 300 is an example implementation of HMD device 104 of FIGS. 1A and 1B, and of HMD device 204 of FIG. 2. The HMD device 300 comprises a frame 302, a first camera 304, a second camera 306, a display, and temple pieces 308A, 308B. In this example, the display comprises a first display 310 and a second display 311 supported by the frame 302, wherein each of the first display 310 and the second display 311 takes the form of a waveguide configured to deliver a projected image to a respective eye of a user. The first camera 304 and the second camera 306 are located respectively at left and right sides of the frame 302, wherein each of the first camera and the second camera are located on the frame adjacent to an outer edge of the frame. The first camera 304 and the second camera 306 can be operated as a stereoscopic camera pair to make indirect depth measurements.

Wearable display device 300 further comprises a first display module 312 positioned adjacent to the first camera 304 for displaying a first image of the stereo image and a second display module 328 positioned adjacent to the second camera 306 for displaying a second image of the stereo image. Each display module may comprise any suitable display technology, such as a scanned beam projector, a microLED (light emitting diode) panel, a microOLED (organic light emitting diode) panel, or a LCoS (liquid crystal on silicon) panel, as examples. Further, various optics, such as the above-mentioned waveguides, one or more lenses, prisms, and/or other optical elements may be used to deliver displayed images to a user's eyes.

In addition to cameras, a wearable display device further may include other types of sensors. For example, wearable display device 300 comprises an inertial measurement unit system (IMU) comprising a first IMU 314 positioned adjacent to the first display module 312 and a second IMU 330 positioned adjacent to the second display module 328. IMU data can be used to adjust a displayed image based upon head motion.

Figure 4:
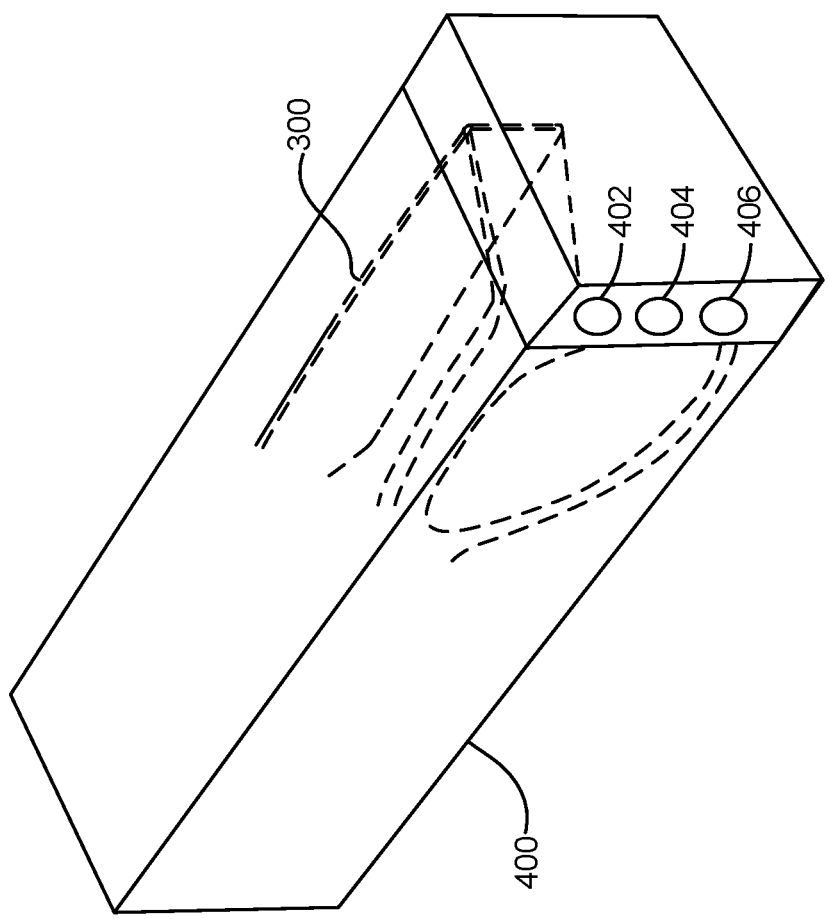
FIG. 4 shows an example HMD case comprising a direct measurement depth sensor.

FIG. 4 shows an example case 400 for an HMD. The case 400 is configured to house the HMD (e.g., HMD 300) when it is not in use. As introduced above, the case 400 is also configured to augment the functionality of an HMD. The case 400 includes a direct-measurement depth sensor in the form of a time-of-flight (ToF) camera comprising a ToF image sensor 402 and ToF illuminator 404. While the case of FIG. 4 includes a single depth sensor, in some examples a case may include two or more depth sensors. Further, in some examples, the case may include a direct-depth sensor other than a ToF camera, such as a structured light depth camera. The ToF camera is configured to resolve distance between sensor pixels of the ToF image sensor 402 and a surface by measuring, for each sensor pixel, the round-trip travel time of a light signal (e.g., amplitude-modulated infrared (IR) light) emitted by the ToF emitter 404. In this manner, the case 400 may be used to obtain a direct measurement of depth that is independent of the HMD 104.

Further, case 400 includes an optional RGB intensity image sensor 406, which may be used, for example, to acquire image data for use in texture mapping. In some examples, the ToF camera may include aspects of the RGB image sensor 406. In such an example, the ToF camera can comprise a camera configured to image in both IR and visible light modes, wherein the camera includes executable instructions to operate in an intensity mode for RGB imaging as well as in a ToF mode for depth imaging.

Figure 5:
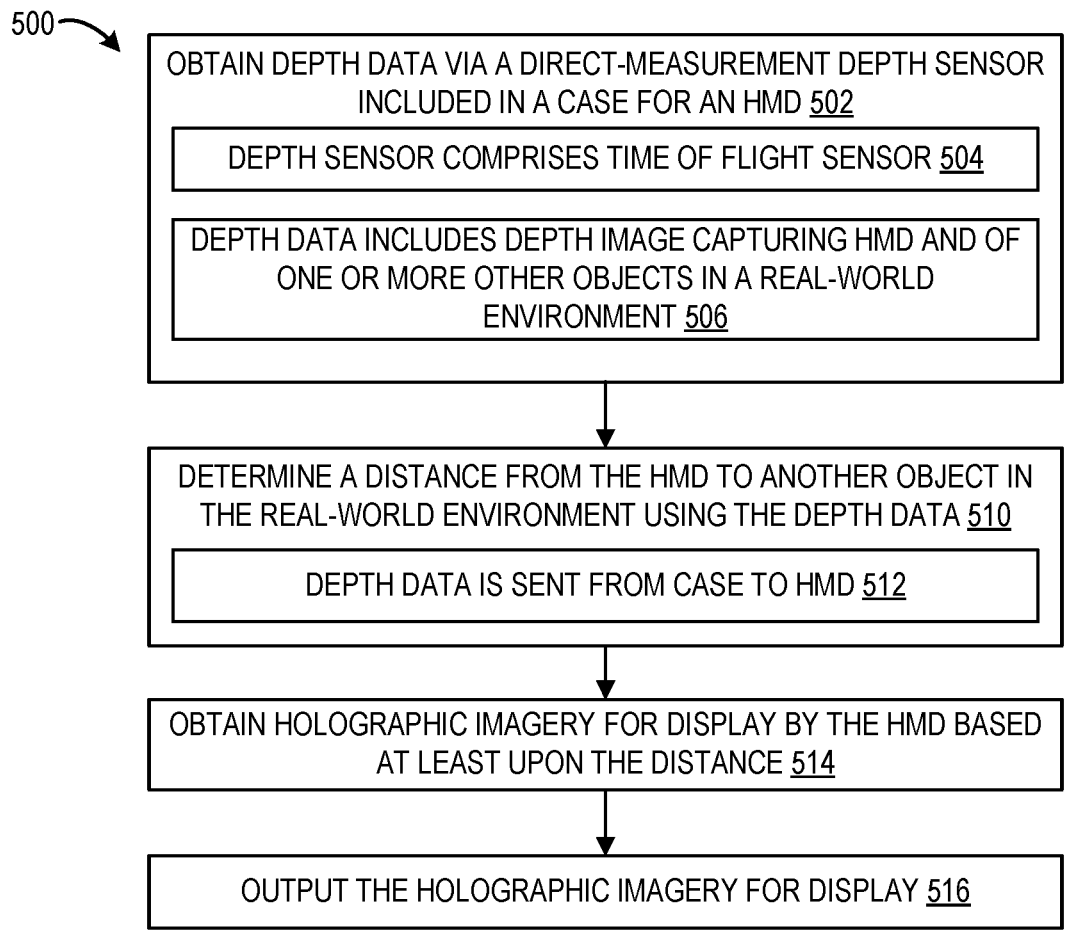
FIG. 5 shows a flow diagram depicting an example method for displaying a hologram via an HMD using direct-measurement depth data acquired via a case for the HMD.

FIG. 5 illustrates a flow diagram depicting an example method 500 for displaying a hologram via an HMD. Method 500 can be performed using any suitable display device, including but not limited to those described herein. In other examples, various steps of method 500 may be omitted or performed in a different order than described, and/or method 500 may include additional and/or alternative steps relative to those illustrated in FIG. 5.

The method 500 includes, at 502, obtaining depth data via a direct-measurement depth sensor included in a case for the HMD, the depth data comprising a depth map of a real-world environment. In some examples, as indicated at 504, the depth data may be obtained via a time-of-flight sensor, while in other examples another suitable depth imaging system can be used, such as a structured light depth sensor. As shown at 506, the depth data includes a depth image capturing the HMD and one or more objects in the real-world environment. For example, referring to FIG. 1B, the case 110 is placed on the table 108 such that the depth sensor 112 has a field of view that encompasses the HMD 104 and a portion of the table 108. As illustrated by example in FIGS. 1B and 4, the case 110 may be shaped such that it can be set on the table 108 or any other suitable surface and provide a suitable field of view of the real-world environment without the use of a stand.

At 510, the method 500 includes using the depth data to determine a distance from the HMD to another object in the real-world environment. In the example of FIG. 1B, depth data from the case 110 may be used to determine a distance from the HMD 104 to a feature of the table 108 (e.g., an edge of the table). In some examples, the determination may be performed on the HMD. As such, at 512, method 500 may comprise sending depth data from the case to the HMD.

Continuing, the method 500 comprises, obtaining holographic imagery for display by the HMD based at least upon the distance determined, as indicated at 514. The method 500 further comprises, at 516, outputting the holographic imagery for display by the HMD. Holographic imagery may be generated on the HMD, or obtained from a device remote from the HMD (e.g., the case, a remote server, a remote peer, or other suitable device).

For example, and with reference again to FIG. 1B, a depth map generated by the direct-measurement depth sensor of the case 110 includes depth values for locations on the surfaces of objects within the room, including the HMD 104. As such, a distance from a selected location on the HMD to an object in the real-world environment can be directly computed from the depth map, thus avoiding any uncertainty with indirect depth measurements acquired using a stereo camera arrangement on the HMD.

Figure 6:
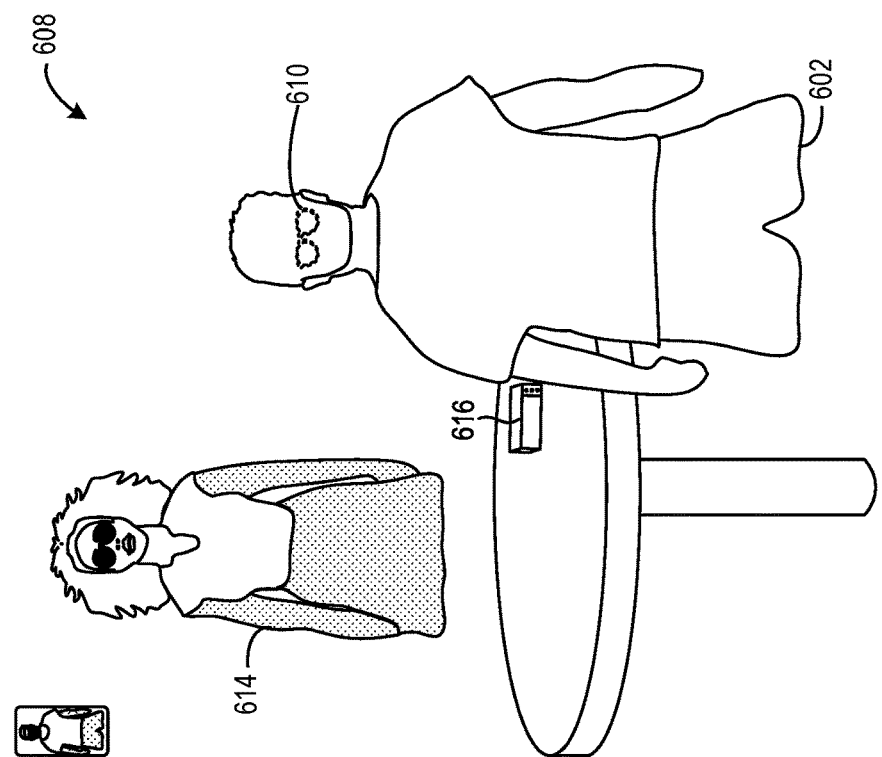
FIG. 6 shows an example scenario depicting a holographic communication session.
Figure 6:
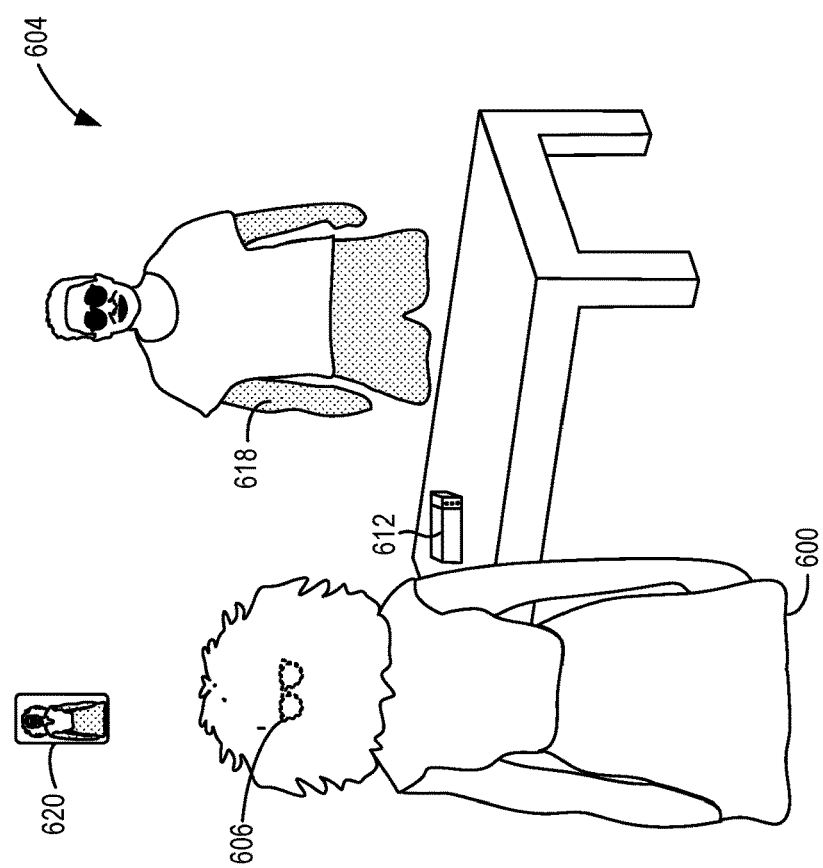

As mentioned above, depth images acquired by an HMD case can be used in holographic communications. FIG. 6 shows a scenario in which a first user 600 and a second user 602 are participating in a holographic communication session. The first user 600 is located in a first real-world environment 604 and is wearing a first HMD 606. The second user 602 is located in a second real-world environment 608 and is wearing a second HMD 610.

As described in more detail below with reference to FIG. 7, a first case 612 for the first HMD 606 is positioned to capture depth data comprising a depth image of the first user 600 and, optionally, texture data comprising a visible image of the first user 600, e.g., using an RGB image sensor optionally included on the case. The texture data maps to the depth data, such that the texture data can be applied to the depth data to generate a hologram of the first user 614 for display to the second user 602 via the second HMD 610. Similarly, a second case 616 for the second HMD 610 is configured to capture a depth image and a visible image of the second user 602 to generate a hologram of the second user 618 for display by the first HMD 606.

In other examples, the cases may be configured to capture depth data and not texture data. In such examples, the depth data can be used to control an avatar that is displayed to the other user. Depth and texture data acquired by the first case can also be sent to the first HMD to display visual feedback 620 to the user of the first case during a call. Likewise, depth and texture data acquired by the second case can also be sent to the second HMD to display visual feedback 622 to the user of the second case during the call.

Figure 7:
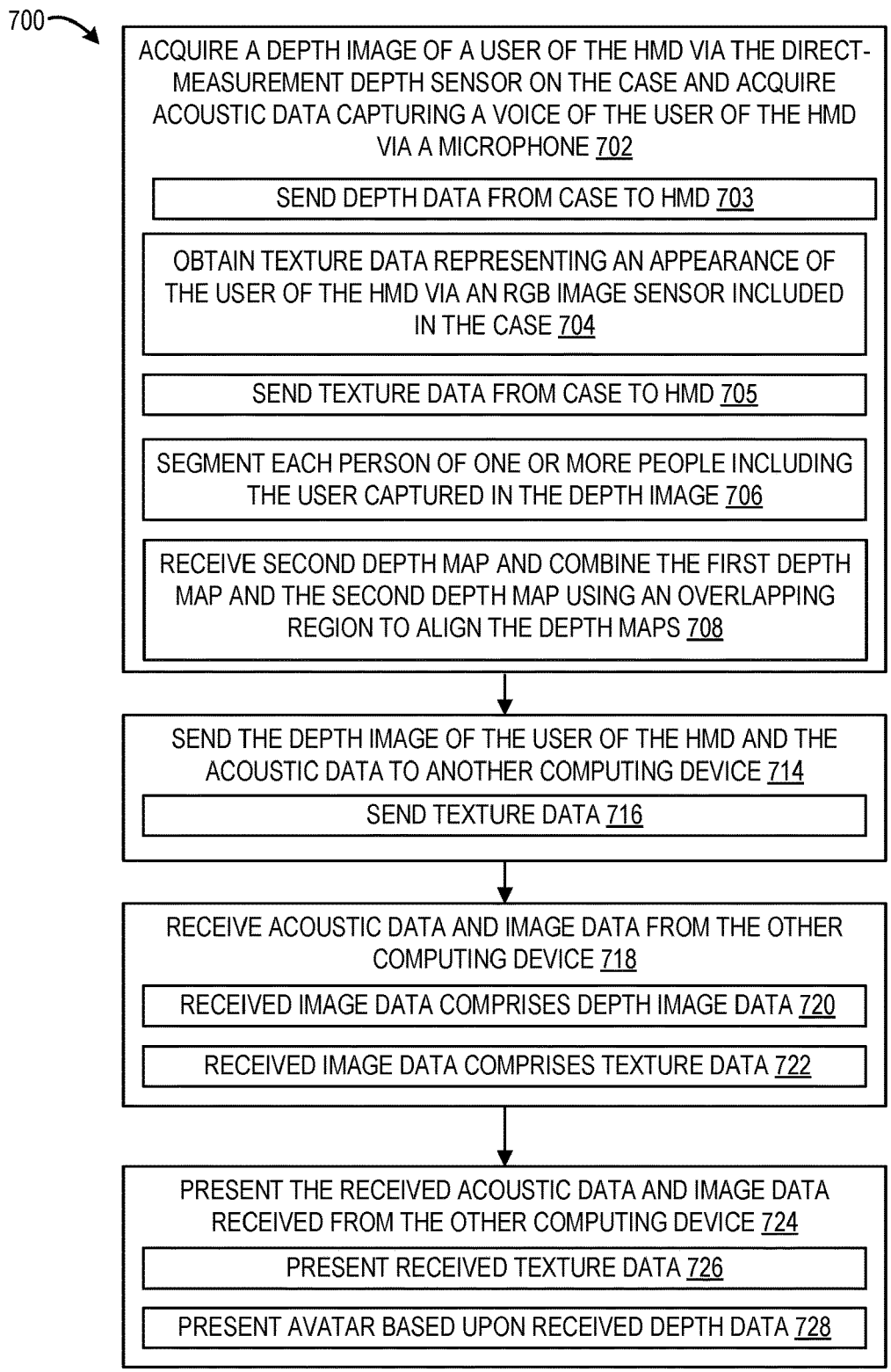
FIG. 7 shows a flow diagram depicting an example method for conducting a holographic communication session using direct-measurement depth data acquired via a case for a HMD.

FIG. 7 illustrates a flow diagram depicting an example method 700 for conducting a holographic communication session. Method 700 can be performed using any suitable display device, including but not limited to those described herein. In other examples, various steps of method 700 may be omitted or performed in a different order than described, and/or method 700 may include additional and/or alternative steps relative to those illustrated in FIG. 7.

At 702, the method 700 includes acquiring a depth image of a user of the HMD via a direct-measurement depth sensor on a case for the HMD and acquiring acoustic data capturing a voice of the user of the HMD via a microphone located on the case or the HMD (e.g., the microphone 228 or the microphone 230 of FIG. 2, respectively). To provide visual feedback to a caller during a call, at 703, the method 700 may include sending depth data from the case to the HMD for display by the HMD.

In some examples, the method 700 may include, at 704, obtaining texture data representing an appearance of the user of the HMD via an RGB image sensor included in the case. In some such examples, the method 700 further may include sending the texture data 705 from the case to the HMD to provide visual feedback during a call. In various examples, depth data alone, RGB image data alone, or depth data plus texture mapped RGB data may be sent to the HMD to provide visual feedback. Where depth data alone is sent, the depth data may be presented as an avatar, or used to control an avatar representing the user.

Figure 8:
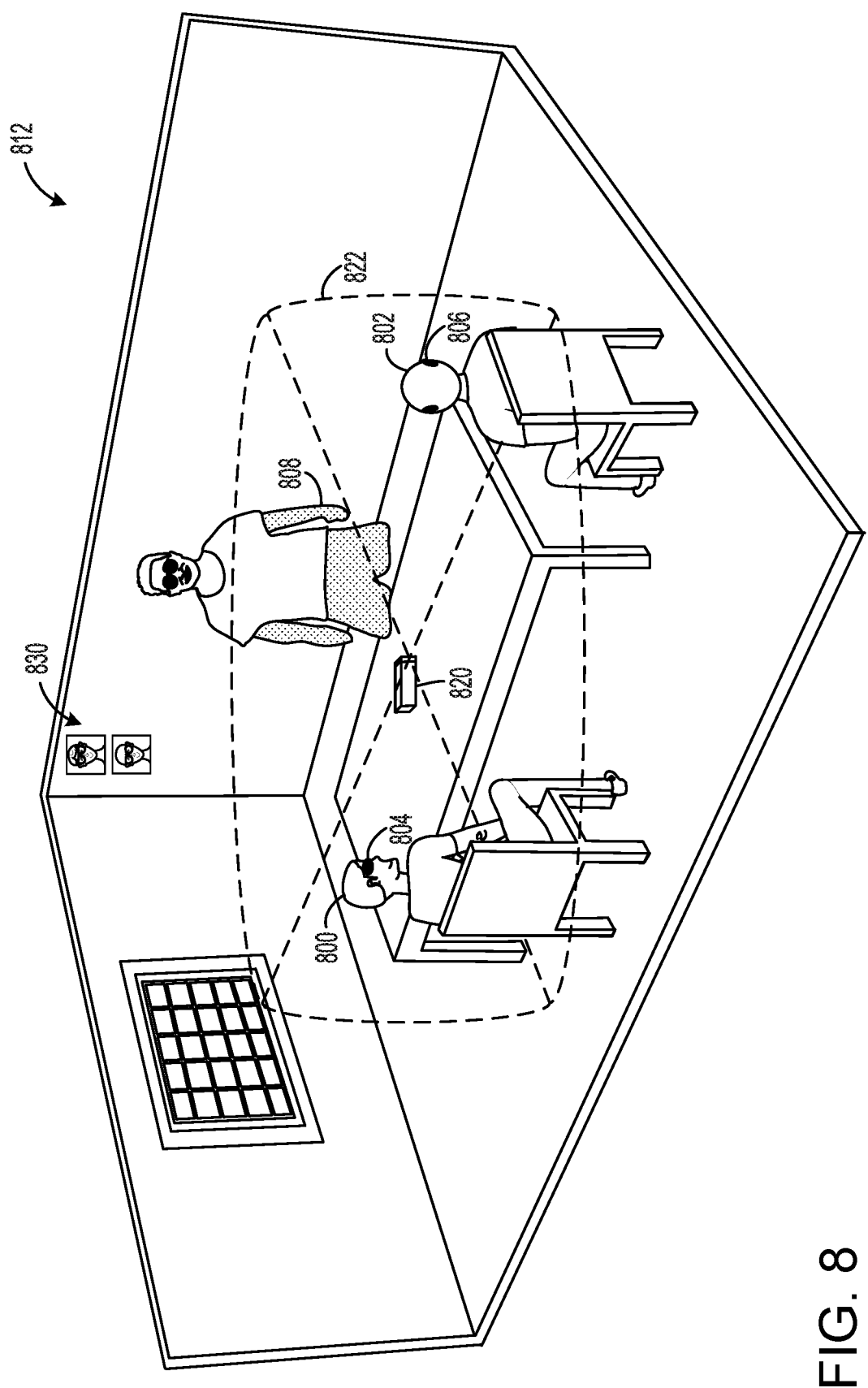
FIG. 8 shows another example scenario depicting a holographic communications session.

In some use contexts, the depth image and/or visible image may capture a plurality of users. FIG. 8 shows an example of such use context, in which a first user 800 and a second user 802 are wearing a first HMD 804 and a second HMD 806, respectively, to participate in a joint holographic communication session with a third user, represented by hologram 808. The first user 800 and the second user 802 are located in a real-world environment 812, while the third user represented by hologram 808 is at a remote location.

As illustrated by example in FIG. 8, the environment 812 includes one case 820 for both the first user 800 and the second user 802. The case 820 is positioned such that the field of view 822 of a direct-measurement depth sensor on the case 820 includes the first user 800 and the second user 802. As such, referring briefly back to FIG. 7, where the depth image includes one or more people, the method 700 may include, at 706, segmenting each person of the one or more people. In the example of FIG. 8, the first user 800 and the second user 802 are segmented from depth image data captured by the depth sensor of the case 820. In some examples, the first user 800 and the second user 802 may be segmented by fitting a skeletal model to the depth image. In other examples, the depth image may be segmented using a thresholding method. It will also be appreciated that any other suitable image segmentation technique may be used. Segmenting may be used, for example, to allow the two users to be presented separately in holographic imagery, such as shown via visual feedback 830 of users 800 and 802. Such visual feedback may be displayed to first and second users 800 and 802 during a call.

Figure 9:
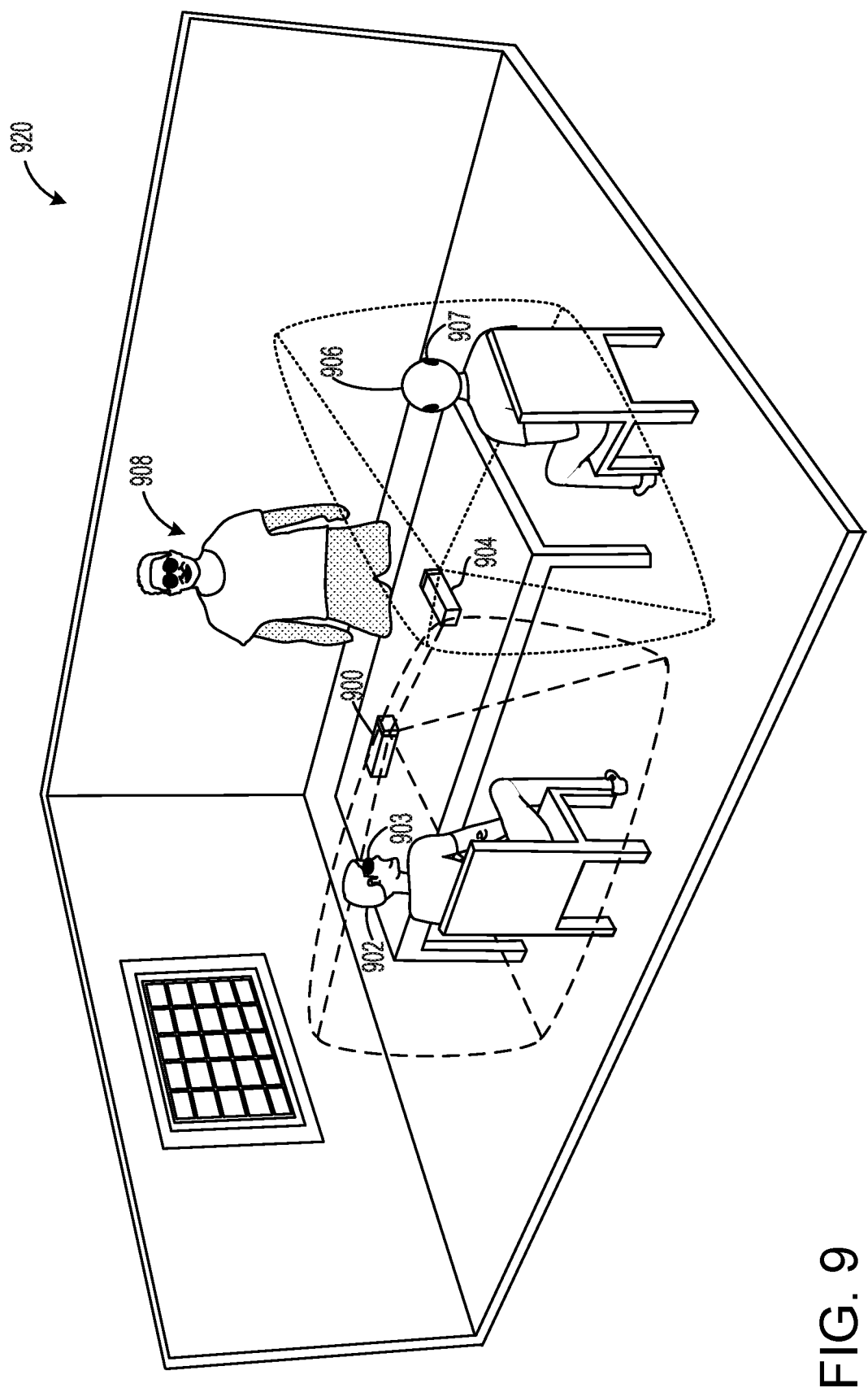
FIG. 9 shows yet another example scenario depicting a holographic communications session.

In some scenarios, more than one HMD case comprising a direct measurement depth sensor may be in a use environment. In such an example, as indicated at 708, first and second depth maps received from first and second HMD cases can be combined into a larger field depth map using an overlapping region in the depth images to align the first and second depth maps. FIG. 9 shows a scenario in which a case 900 comprising a direct measurement depth sensor is positioned to capture a depth image of a first user 902 wearing a first HMD 903, and in which a second case 904 is positioned to capture a depth image of the second user 906 wearing a second HMD 907. In the example of FIG. 9, both users are participating in the same holographic communication session with a remote user represented by hologram 908.

A computing device that is facilitating the call (e.g., a cloud-based communication service, as an example) may receive a first depth map (and optionally visual texture data) from the first case 900 and a second depth map (and optionally visual texture data) from the second case 904. Where depth maps obtained from each overlap, the first and second depth maps can be combined using an overlapping region to create a combined depth map. Various types of data received from the HMD devices 903 and/or 907 may be used to determine that both the first user 902 and the second user 906 are in the same environment 920 for the purpose of combining depth images. For example, the HMD devices 903 and/or 907 may have GPS capabilities that can be used to localize the devices. In other examples, the HMD devices 903 and/or 907 may be localized using Wi-Fi or cellular data signals. It will also be appreciated that the locations of the HMD devices may be determined in any other suitable manner.

The combined depth maps can be used to recreate the real-world environment as a 3D model, and/or capture interactions between a plurality of people in the environment by determining their relative positions with respect to each other. In another potential advantage of the present disclosure, a combined depth map may be transmitted to each device participating in a shared augmented reality (AR)/virtual reality (VR) experience, instead of two or more depth maps that are configured to be displayed.

Returning to FIG. 7, at 714, the method 700 includes sending the depth image of the user of the HMD and the acoustic data to another computing device. Texture data also may be optionally sent, as indicated at 716. Referring to FIG. 6, the other device may comprise, for example, a cloud-based computing system (not shown) facilitating the holographic communication session of FIG. 6. In such an example, the cloud-based computing system can provide the HMD 610 of the second user 602 with depth image data and/or texture data of the first user 600 captured by the case 612 of FIG. 6 (e.g., for rendering by case 616 or HMD 610), or can provide holographic video image frames (e.g., stereo image frames) rendered by the cloud-based system based upon the depth data and potentially texture data for presentation by HMD 610.

The method 700 further includes, at 718, receiving acoustic data and image data from the other computing device. In some examples, the image data can include depth image data as indicated at 720 and/or texture data as indicated at 722 capturing a second user at a remote location. The method 700 also comprises presenting the received acoustic data and image data at 724. For example, the depth image data received from the case 616 can be used to render the hologram 618 of the second user 602 that is displayed to the first user 600. As indicated at 726, the received texture data can be presented, for example, by applying the texture data (e.g., a visible appearance of the second user 602) to the depth data to generate the hologram of the second user 618. In other examples, the received image data may comprise video frames rendered by a remote service.

As described above, and as indicated at 728, in some instances texture data may not be available. In such examples such, an avatar that depicts the second user can be generated and displayed to the first user based upon depth data received from the other user. Similarly, an avatar that depicts the first user can be generated and displayed to the second user.

Figure 10:
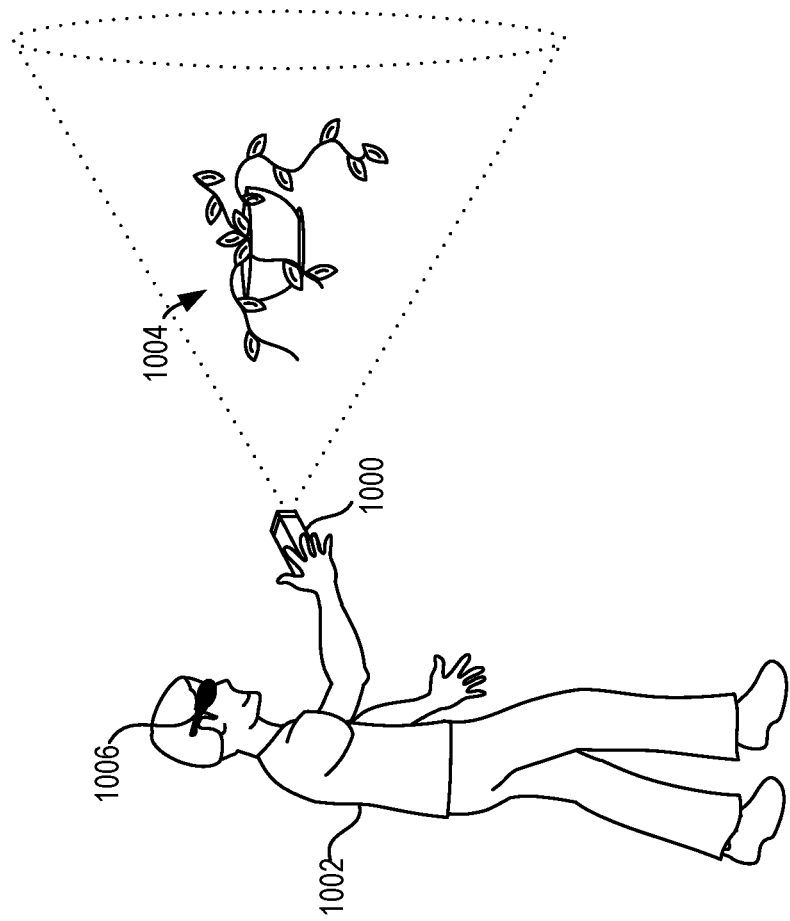
FIG. 10 shows a scenario in which a case for an HMD is used to scan a physical object to form a digital 3D model of the physical object.

An HMD case comprising a direct-measurement depth sensor also may be used as a convenient scanning device to form three-dimensional scans of a target object to obtain a three-dimensional model of the object. Scanning the object with a depth sensor on a case may provide a more convenient experience than scanning the object using a depth sensor on an HMD. FIG. 10 shows a scenario in which a case 1000 comprising a direct measurement depth sensor is used to generate a 3D model of an object. In this example, the user 1002 is scanning the case 1000 around a potted plant 1004 to obtain depth and/or visual image data that captures the potted plant 1004 from a plurality of angles. In this manner, the user 1002 can build a three-dimensional model of the object without having to manipulate the object itself or undertaking uncomfortable head gyrations to capture the object using the HMD 1006.

In some examples, and as described in more detail below with reference to FIG. 11, depth data obtained using the case can be compared to depth data obtained using the HMD to compensate for any errors in the depth data obtained by the HMD. For example, the HMD 300 of FIG. 3 may undergo a factory calibration process such that the first camera 304 and the second camera 306 may be used to obtain depth information via stereoscopic imaging. However, events such as temperature changes, humidity changes, and shocks can cause one or both of the cameras to go out of calibration. For example, if the HMD 300 is bent, one or both of the cameras may face slightly different directions, and depth information provided by the stereo pair will be different than information from the HMD in its original state. Accordingly, the depth data obtained using a direct-measurement depth sensor on a case for the HMD can be used to perform field calibration or data correction on one or more indirect-measurement depth sensors (e.g., the first camera 304 and the second camera 306).

Figure 11:
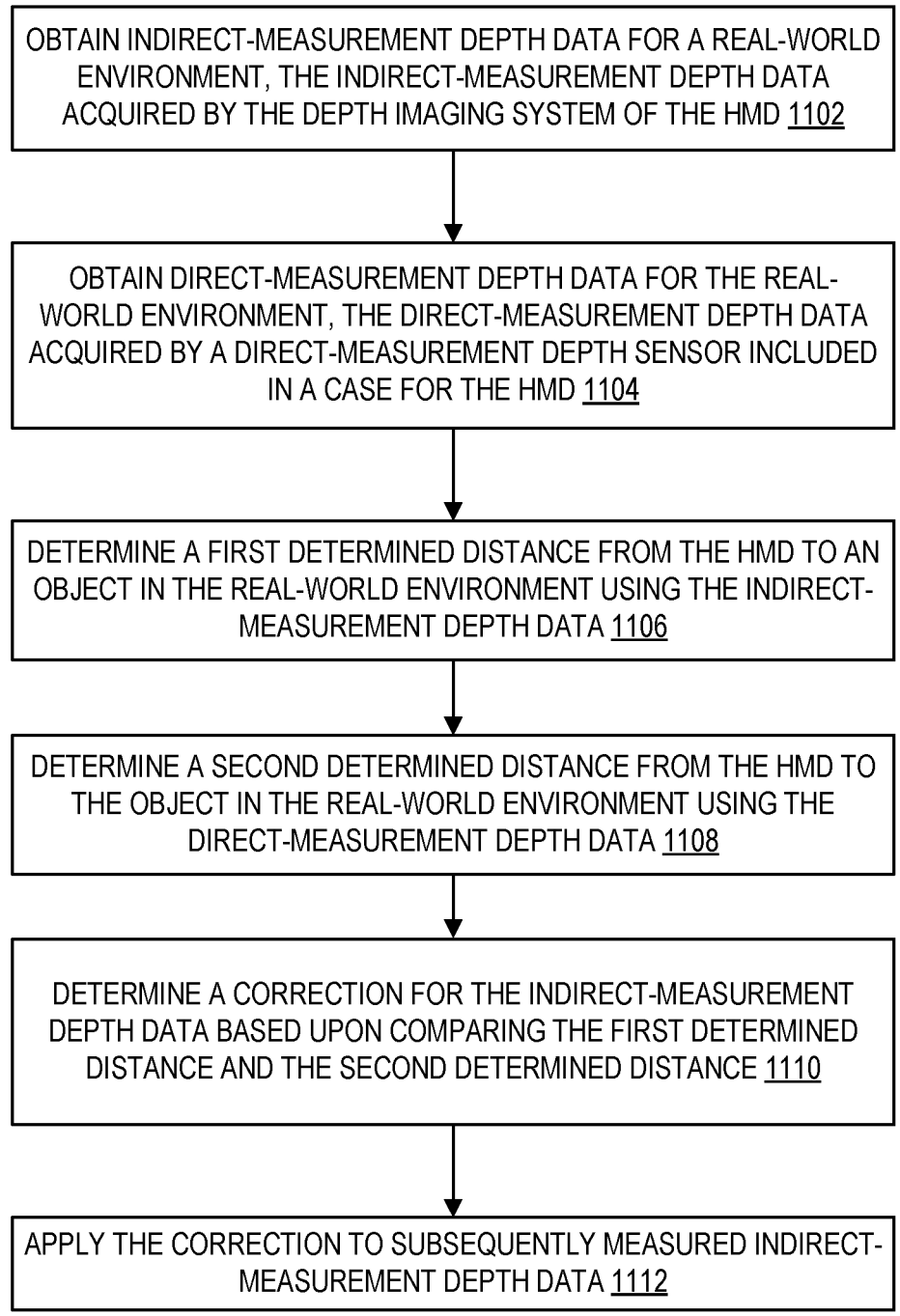
FIG. 11 shows a flow diagram depicting an example method for calibrating a depth imaging system of an HMD using direct-measurement depth data acquired via a case for the HMD.

FIG. 11 illustrates a flow diagram depicting an example method 1100 for calibrating a depth imaging system of an HMD. Method 1100 can be performed using any suitable display device, including but not limited to those described herein. In other examples, various steps of method 1100 may be omitted or performed in a different order than described, and/or method 1100 may include additional and/or alternative steps relative to those illustrated in FIG. 11.

The method 1100 includes, at 1102, obtaining indirect-measurement depth data for a real-world environment. As introduced above, the indirect-measurement depth data is acquired by the depth imaging system of the HMD. For example, the indirect-measurement depth data may comprise depth information obtained from the first camera 304 and the second camera 306 of the HMD 300 of FIG. 3.

The method 1100 further includes, at 1104, obtaining direct-measurement depth data for the real-world environment. As described above, the direct-measurement depth data is acquired by a direct-measurement depth sensor included in a case for the HMD. For example, the direct-measurement depth data may be obtained using an IR time-of-flight depth sensor (e.g., the ToF sensor 112 of FIG. 1). The direct-measurement depth data includes a depth image of both the HMD and another object in the environment. In this manner, the depth data can be used to make a direct measurement of distance from the HMD to the other object.

At 1106, the method 1100 includes determining a first determined distance from the HMD to an object in the real-world environment using the indirect-measurement depth data. At 1108, the method 1100 includes determining a second determined distance from the HMD to the object in the environment using the direct-measurement depth data.

A correction for the indirect measurement depth data is determined based upon comparing the first determined distance and the second determined distance, as indicated at 1110. For example, one or more error measurements (e.g., in the position and orientation of the first camera 304 and the second camera 306) may be determined if there is a discrepancy between a depth map assembled using the direct-measurement depth data and the indirect-measurement depth data while fusing the coordinate systems of the HMD and the case. Accordingly, direct-measurement depth data obtained from the case may be used to determine one or more correction operations to apply the indirect-measurement depth data. For example, the direct-measurement depth data can be used to determine one or more mathematical terms describing how the first camera 304 and the second camera 306 could be repositioned or rotated for the stereoscopic depth information to match the direct-measurement depth data.

The determined correction is applied to real-time indirect-measurement depth data at 1112. In this manner, an independent depth measurement can be used to correct for any errors in the HMD's depth perception while the HMD is running. In some examples, the correction may be stored as calibration data to apply to subsequent indirect measurements. In this manner, the indirect-measurement depth data may be corrected even if the case is offline.

In some embodiments, the methods and processes described herein may be tied to a computing system of one or more computing devices. In particular, such methods and processes may be implemented as a computer-application program or service, an application-programming interface (API), a library, and/or other computer-program product.

Figure 12:
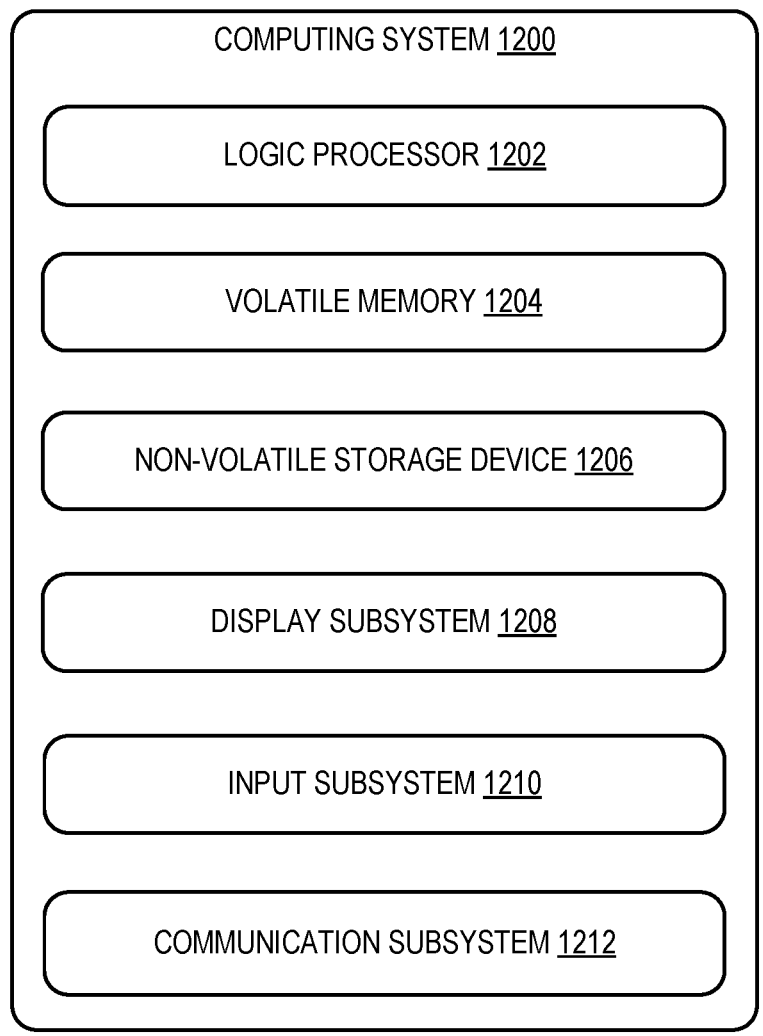
FIG. 12 shows a schematic diagram of an example computing system.

FIG. 12 schematically shows an example of a computing system 1200 that can enact one or more of the devices and methods described above. Computing system 1200 is shown in simplified form. Computing system 1200 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices. In some examples, the computing system 1200 may embody the HMD 104, the case 110, the HMD 202, the case 204, the remote computing system 240, the HMD 300, the HMD 606, the HMD 610, the case 612, the case 616, the HMD 804, the HMD 806, the case 820, the HMD 903, the HMD 907, the case 900, the case 904, the case 1000, and/or the HMD 1006.

The computing system 1200 includes a logic processor 1202 volatile memory 1204, and a non-volatile storage device 1206. The computing system 1200 may optionally include a display subsystem 1208, input subsystem 1210, communication subsystem 1212, and/or other components not shown in FIG. 12.

Logic processor 1202 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1202 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 1206 includes one or more physical devices configured to hold instructions executable by the logic processors to implement the methods and processes described herein. When such methods and processes are implemented, the state of non-volatile storage device 1206 may be transformed—e.g., to hold different data.

Non-volatile storage device 1206 may include physical devices that are removable and/or built-in. Non-volatile storage device 1206 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1206 may include nonvolatile, dynamic, static, read/write, read-only, sequential-access, location-addressable, file-addressable, and/or content-addressable devices. It will be appreciated that non-volatile storage device 1206 is configured to hold instructions even when power is cut to the non-volatile storage device 1206.

Volatile memory 1204 may include physical devices that include random access memory. Volatile memory 1204 is typically utilized by logic processor 1202 to temporarily store information during processing of software instructions. It will be appreciated that volatile memory 1204 typically does not continue to store instructions when power is cut to the volatile memory 1204.

Aspects of logic processor 1202, volatile memory 1204, and non-volatile storage device 1206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1200 typically implemented in software by a processor to perform a particular function using portions of volatile memory, which function involves transformative processing that specially configures the processor to perform the function. Thus, a module, program, or engine may be instantiated via logic processor 1202 executing instructions held by non-volatile storage device 1206, using portions of volatile memory 1204. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 1208 may be used to present a visual representation of data held by non-volatile storage device 1206. The visual representation may take the form of a graphical user interface (GUI). As the herein described methods and processes change the data held by the non-volatile storage device, and thus transform the state of the non-volatile storage device, the state of display subsystem 1208 may likewise be transformed to visually represent changes in the underlying data. Display subsystem 1208 may include one or more display devices utilizing virtually any type of technology. Such display devices may be combined with logic processor 1202, volatile memory 1204, and/or non-volatile storage device 1206 in a shared enclosure, or such display devices may be peripheral display devices.

When included, input subsystem 1210 may comprise or interface with one or more user-input devices such as a keyboard, mouse, touch screen, or game controller. In some examples, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1212 may be configured to communicatively couple various computing devices described herein with each other, and with other devices. Communication subsystem 1212 may include wired and/or wireless communication devices compatible with one or more different communication protocols. For example, the communication subsystem may be configured for communication via a wireless telephone network, or a wired or wireless local- or wide-area network. In some examples, the communication subsystem may allow computing system 1200 to send and/or receive messages to and/or from other devices via a network such as the Internet.

Another example provides, on a computing system comprising a head-mounted display device (HMD) and a case for the head-mounted display device, a method for displaying a hologram via the HMD, the method comprising: obtaining depth data from a direct-measurement depth sensor included in the case for the HMD, the depth data comprising a depth map of a real-world environment; determining a distance from the HMD to an object in the real-world environment using the depth map; obtaining holographic imagery for display based at least upon the distance; and outputting the holographic imagery for display on the HMD. Obtaining the depth data from the direct-measurement depth sensor may additionally or alternatively include obtaining the depth data from a time-of-flight sensor on the case. Determining the distance may additionally or alternatively include sending the depth map from the case to the HMD, and determining the distance on the HMD. The method may additionally or alternatively include obtaining a depth image of a user of the HMD via the direct-measurement depth sensor during a holographic communication session, sending the depth image of the user to the HMD during the holographic communication session, and displaying on the HMD a representation of the user based upon the depth image of the user. The method may additionally or alternatively include obtaining texture data representing an appearance of the user of the HMD, and displaying the texture data in the representation of the user. The method may additionally or alternatively include sending the depth image of the user to another HMD participating in the holographic communication session. The depth data may additionally or alternatively include a depth image of a plurality of people including a user of the HMD, and the method may additionally or alternatively include segmenting each person of the plurality of people. The depth data may additionally or alternatively include first depth data from a first direct-measurement depth sensor, the depth map may additionally or alternatively include a first depth map, and the method may additionally or alternatively include: obtaining second depth data from a second direct-measurement depth sensor, the second depth data comprising a second depth map of the real-world environment; detecting an overlapping region in the first depth map and the second depth map; and using the overlapping region to combine the first depth map and the second depth map. The HMD may additionally or alternatively include a depth imaging system comprising a stereo camera arrangement configured to obtain indirect-measurement depth data, the distance may additionally or alternatively include a first distance, and the method may additionally or alternatively include calibrating the depth imaging system by obtaining indirect-measurement depth data for the real-world environment via the depth imaging system of the HMD; determining a second determined distance from the HMD to the object in the real-world environment using the indirect-measurement depth data; comparing the first determined distance and the second determined distance to determine a correction for the indirect-measurement depth data; and applying the correction to subsequently measured indirect-measurement depth data. The method may additionally or alternatively include obtaining a three-dimensional model of a target object by scanning the target object with the direct-measurement depth sensor included in the case from a plurality of angles.

Another example provides a system comprising: a head-mounted display device (HMD) and a case for the head-mounted display device, the HMD comprising a see-through display system, a first communications system, and a first computing system configured to control the display of images via the see-through display system and to control communication with the case via the first communications system; and the case comprising a direct-measurement depth sensor, a second communications system, and a second computing system configured to control the direct-measurement depth sensor to acquire depth data of a real-world environment and to control the second communications system to send depth data to the HMD. The direct-measurement depth sensor may additionally or alternatively include a time-of-flight sensor. The case may additionally or alternatively include a red/green/blue (RGB) intensity image sensor. One or more of the first computing system and the second computing system may additionally or alternatively include instructions executable to use RGB image data acquired via the RGB intensity image sensor as texture data for corresponding depth data. The HMD may additionally or alternatively include an indirect-measurement depth sensing system. One or more of the first computing system and the second computing system may additionally or alternatively include instructions executable to calibrate the indirect-measurement depth sensing system using depth data from the direct-measurement depth sensor. One or more of the first computing system and the second computing system may additionally or alternatively include instructions executable to determine a distance from the HMD to an object in the real-world environment using the depth data of the real-world environment, and to compute a holographic image for display based upon the distance. The depth data may additionally or alternatively include a three-dimensional model of an object in the real-world environment.

Another example provides a system comprising: a head-mounted display device (HMD) and a case for the head-mounted display device, the HMD comprising a see-through display system, a first communications system, and a first computing system, the case comprising a direct-measurement depth sensor, a second communications system, and a second computing system, and the system also comprising a microphone located on the case or the HMD, wherein the system is configured to conduct a holographic communication session by acquiring a depth image of a user of the HMD via the direct-measurement depth sensor on the case, acquiring first acoustic data capturing a voice of the user of the HMD via the microphone, sending the depth image of the user of the HMD and the first acoustic data to another computing device, receiving second acoustic data and image data from the other computing device, and presenting the second acoustic data and image data received from the other computing device. The case may additionally or alternatively include a red/green/blue (RGB) image sensor, and the system may be additionally or alternatively configured to obtain texture data representing an appearance of the user of the HMD via the RGB image sensor, and to send the texture data to the other computing device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. On a computing system comprising a head-mounted display device (HMD) and a case for the head-mounted display device, a method for displaying a hologram via the HMD, the method comprising:
    obtaining depth data from a direct-measurement depth sensor included in the case for the HMD, the depth data comprising a depth map of a real-world environment;
    sending the depth map from the case to the HMD;
    on the HMD, determining a distance from the HMD to an object in the real-world environment using the depth map;
    obtaining holographic imagery for display based at least upon the distance; and
    outputting the holographic imagery for display on the HMD.

2. The method of claim 1, wherein obtaining the depth data from the direct-measurement depth sensor comprises obtaining the depth data from a time-of-flight sensor on the case.

3. The method of claim 1, further comprising obtaining a depth image of a user of the HMD via the direct-measurement depth sensor during a holographic communication session, sending the depth image of the user to the HMD during the holographic communication session, and displaying on the HMD a representation of the user based upon the depth image of the user.

4. The method of claim 3, further comprising obtaining texture data representing an appearance of the user of the HMD, and displaying the texture data in the representation of the user.

5. The method of claim 4, further comprising sending the depth image of the user to another HMD participating in the holographic communication session.

6. The method of claim 1, wherein the depth data further comprises a depth image of a plurality of people including a user of the HMD, the method further comprising segmenting each person of the plurality of people.

7. The method of claim 1, wherein the depth data comprises first depth data from a first direct-measurement depth sensor, wherein the depth map comprises a first depth map, and the method further comprising:
    obtaining second depth data from a second direct-measurement depth sensor, the second depth data comprising a second depth map of the real-world environment;
    detecting an overlapping region in the first depth map and the second depth map; and
    using the overlapping region to combine the first depth map and the second depth map.

8. The method of claim 1, wherein the HMD includes a depth imaging system comprising a stereo camera arrangement configured to obtain indirect-measurement depth data, wherein the distance is a first determined distance, and wherein the method further comprises calibrating the depth imaging system by
    obtaining indirect-measurement depth data for the real-world environment via the depth imaging system of the HMD;
    determining a second determined distance from the HMD to the object in the real-world environment using the indirect-measurement depth data;
    comparing the first determined distance and the second determined distance to determine a correction for the indirect-measurement depth data; and
    applying the correction to subsequently measured indirect-measurement depth data.

9. The method of claim 1, further comprising obtaining a three-dimensional model of a target object by scanning the target object with the direct-measurement depth sensor included in the case from a plurality of angles.

10. The method of claim 1, further comprising using the depth map to determine a placement of the holographic imagery.

11. A system comprising:
    a head-mounted display device (HMD) and a case for the head-mounted display device,
    the HMD comprising
        a see-through display system,
        a first communications system,
        an indirect-measurement depth sensing system, and
        a first computing system configured to control the display of images via the see-through display system and to control communication with the case via the first communications system; and
    the case comprising
        a direct-measurement depth sensor,
        a second communications system, and
        a second computing system configured to control the direct-measurement depth sensor to acquire depth data of a real-world environment and to control the second communications system to send depth data to the HMD.

12. The system of claim 11, wherein the direct-measurement depth sensor comprises a time-of-flight sensor.

13. The system of claim 11, wherein the case further comprises a red/green/blue (RGB) intensity image sensor.

14. The system of claim 13, wherein one or more of the first computing system and the second computing system comprises instructions executable to use RGB image data acquired via the RGB intensity image sensor as texture data for corresponding depth data.

15. The system of claim 11, wherein one or more of the first computing system and the second computing system comprises instructions executable to calibrate the indirect-measurement depth sensing system using depth data from the direct-measurement depth sensor.

16. The system of claim 11, wherein one or more of the first computing system and the second computing system comprises instructions executable to determine a distance from the HMD to an object in the real-world environment using the depth data of the real-world environment, and to compute a holographic image for display based upon the distance.

17. The system of claim 11, wherein the depth data further comprises a three-dimensional model of an object in the real-world environment.

18. The system of claim 11, wherein the case is operatively configured to obtain a depth image of a user of the HMD via the direct-measurement depth sensor during a holographic communication session.

19. A system comprising:
   a head-mounted display device (HMD) and a case for the head-mounted display device,
   the HMD comprising a see-through display system, a first communications system, and a first computing system,
   the case comprising a direct-measurement depth sensor, a second communications system, and a second computing system, and
   the system also comprising a microphone located on the case or the HMD, wherein the system is configured to conduct a holographic communication session by
      acquiring a depth image of a user of the HMD via the direct-measurement depth sensor on the case,
      acquiring first acoustic data capturing a voice of the user of the HMD via the microphone,
      sending the depth image of the user of the HMD and the first acoustic data to another computing device,
      receiving second acoustic data and image data from the other computing device, and
      presenting the second acoustic data and image data received from the other computing device.

20. The system of claim 19, wherein the case further comprises a red/green/blue (RGB) image sensor, and wherein the system is further configured to obtain texture data representing an appearance of the user of the HMD via the RGB image sensor, and to send the texture data to the other computing device.

* * * * *